Patented Nov. 24, 1953

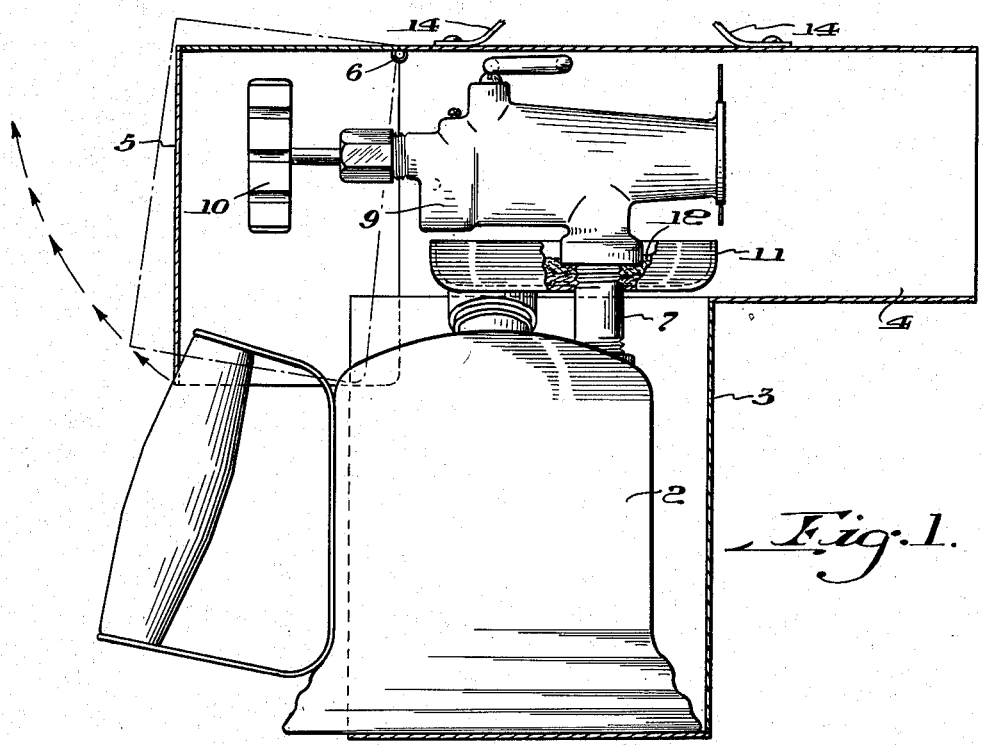
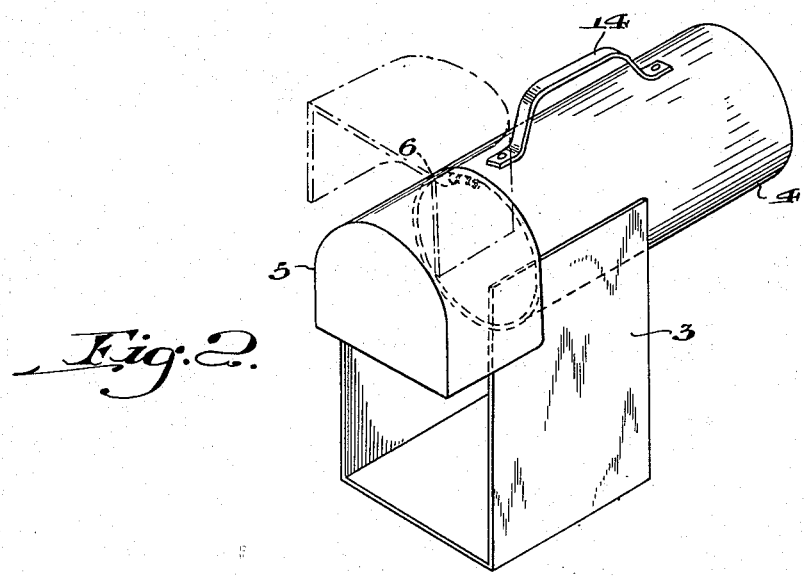
INVENTORS.
HARRY H. SHERMAN,
MYER A. SILVERMAN.
BY Archworth Martin
their
ATTORNEY.

2,660,231

UNITED STATES PATENT OFFICE 2,660,231

BLOWTORCH HOOD

Harry H. Sherman and Myer A. Silverman, Grove City, Pa., assignors to P. Wall Mfg. Company, Grove City, Pa., a corporation of Pennsylvania Application April 8, 1952, Serial No. 281,068

1 Claim. (Cl. 158—33)

Our invention relates to the art of blow torches, but is directed more particularly to a temporary housing or hood therefor.

In using, the blow torches of the pressure-tank type, wherein gasoline or light fuel is atomized for the purpose of combustion at a torch nozzle, difficulty is experienced in projecting and maintaining adequate atomization and combustion at frigid temperatures such as frequently exist in the Arctic regions or at sub-zero.

Our invention has for its object the provision of means for shielding the torch head against chilling temperatures either when preparing the torch for operation or maintaining proper combustion under service conditions.

In the accompanying drawing, Figure 1 is a longitudinal sectional view through the hood, showing the manner in which a blow torch is maintained therein, and Fig. 2 is a perspective view on a smaller scale showing the hood when the torch is removed.

The torch may be of a conventional type such as that described in our application Serial No. 281,083, filed April 8, 1952, and comprises the usual pressure-fuel tank 2. The hood comprises a main chamber 3 for receiving the tank 2 and is normally open at its rear side. The tubular nozzle-like extension 4 is carried by the upper end of the chamber 3 and has a flap or cap 5 hinged thereto at 6, so that it can be raised and lowered to partly enclose the chamber 3 and the rear end of the cylindrical member 4.

The torch has the usual conduit 7 leading to the ports in the valve body 9 as shown for example in our said application, the valve being provided with the usual operating handle 10. The drip pan 11 is carried by the conduit 7, in position to receive gasoline or other priming liquid, for preliminary heating of the torch barrel. A wick 12 is preferably contained within the pan to become saturated and hence to give a more effective flame for preliminary heating.

The hood can be permitted to remain in place during use of the torch, since the flame which emanates from the forward end of the torch nozzle can be discharged through the open end of the tube 4. The hinge flap 5 will, of course, be swung to its upper portion as shown in broken lines in Fig. 2, to permit entry of and removal of the torch from the hood. Also, it can be kept raised when the torch is in use if weather conditions permit. Primarily, the purpose is to direct a large volume of heated air past the torch barrel, for thawing or heating purposes.

Whether or not any preliminary heating of the torch barrel from the burner device at 11—12 is deemed to be necessary, the hood will serve a useful purpose in shielding the torch against cold blasts of air that might interfere with its proper functioning.

A handle 14 on the hood cylinder 4 serves as a convenient carrying handle and also for manipulating the torch and the hood as a unit, when the hood is left in place while using the torch.

We claim as our invention:

The combination with a blow torch of the type having a pressure fuel tank that is provided with a handle on its rear side and with the valve chamber on its upper end, and having a forwardly-extending torch barrel on its upper portion, and also having a valve-operating stem projecting rearwardly from the valve chamber, of a hood comprising a vertical chamber normally at its rear side to receive said tank, a horizontally-extending cylindrical chamber open at both ends and at its lower rear portion and being carried by the said vertical chamber in position to receive the torch barrel of a pressure tank inserted into the said vertical chamber, a closure member hingedly connected to an upper portion of the cylindrical chamber, at its rear end, the closure member, when in its lower position extending across the direct path of entry into the rear end of the cylindrical chamber, a carrying handle on the top of the cylindrical chamber, and a bottom wall for the said vertical chamber, upon which the blow torch will be supported when the assembly is carried by said handle.

HARRY H. SHERMAN.
MYER A. SILVERMAN.

References Cited in the file of this patent

UNITED STATES PATENTS

| Number | Name | Date |
|---|---|---|
| 1,563,427 | Martin | Dec. 1, 1925 |
| 1,946,383 | Blaskewitz | Feb. 6, 1934 |
| 2,396,821 | Breese | Mar. 19, 1946 |

FOREIGN PATENTS

| Number | Country | Date |
|---|---|---|
| 23,422 | Great Britain | Mar. 2, 1911 |
| 185,631 | Great Britain | Sept. 14, 1922 |